Patented July 8, 1924.

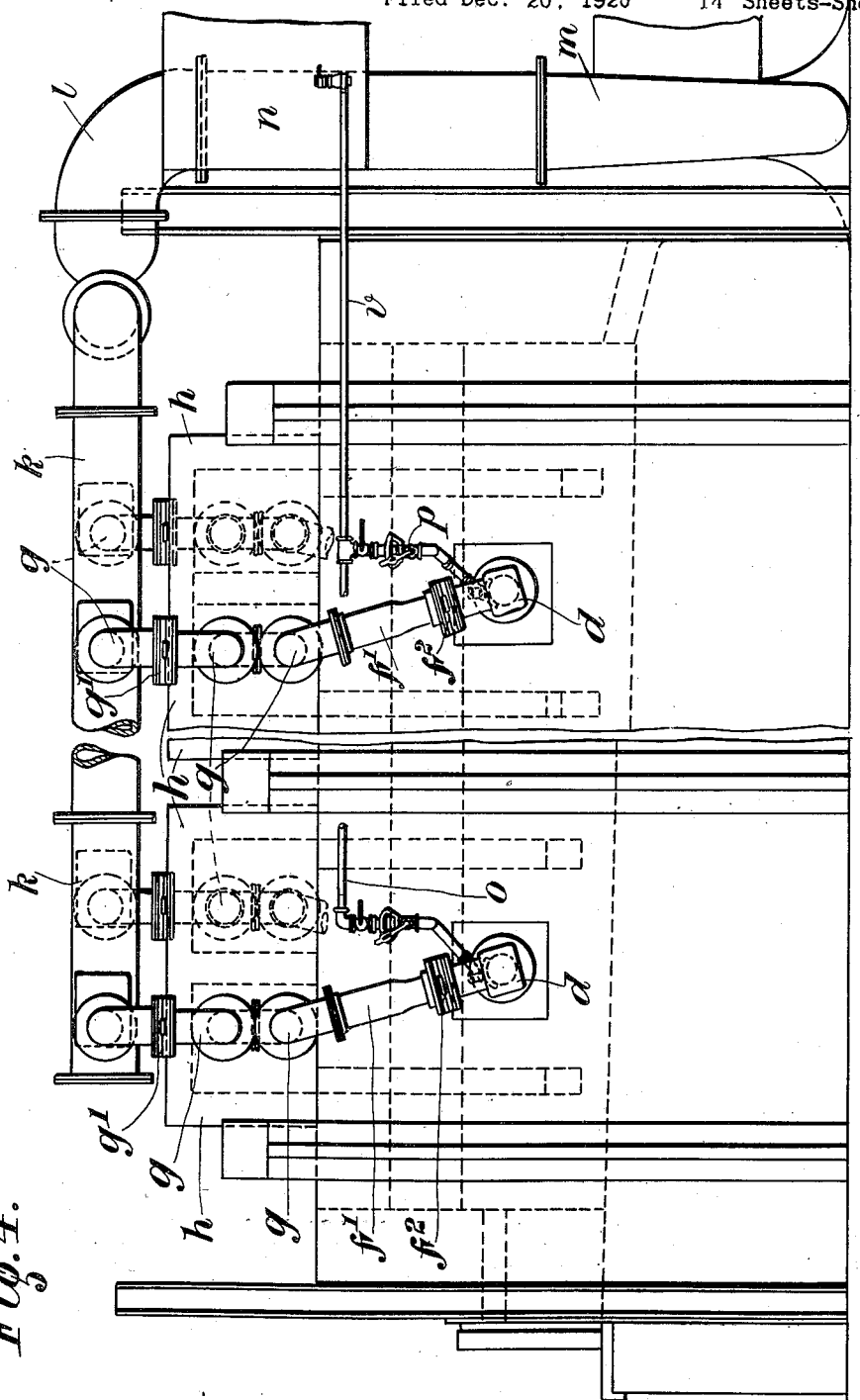

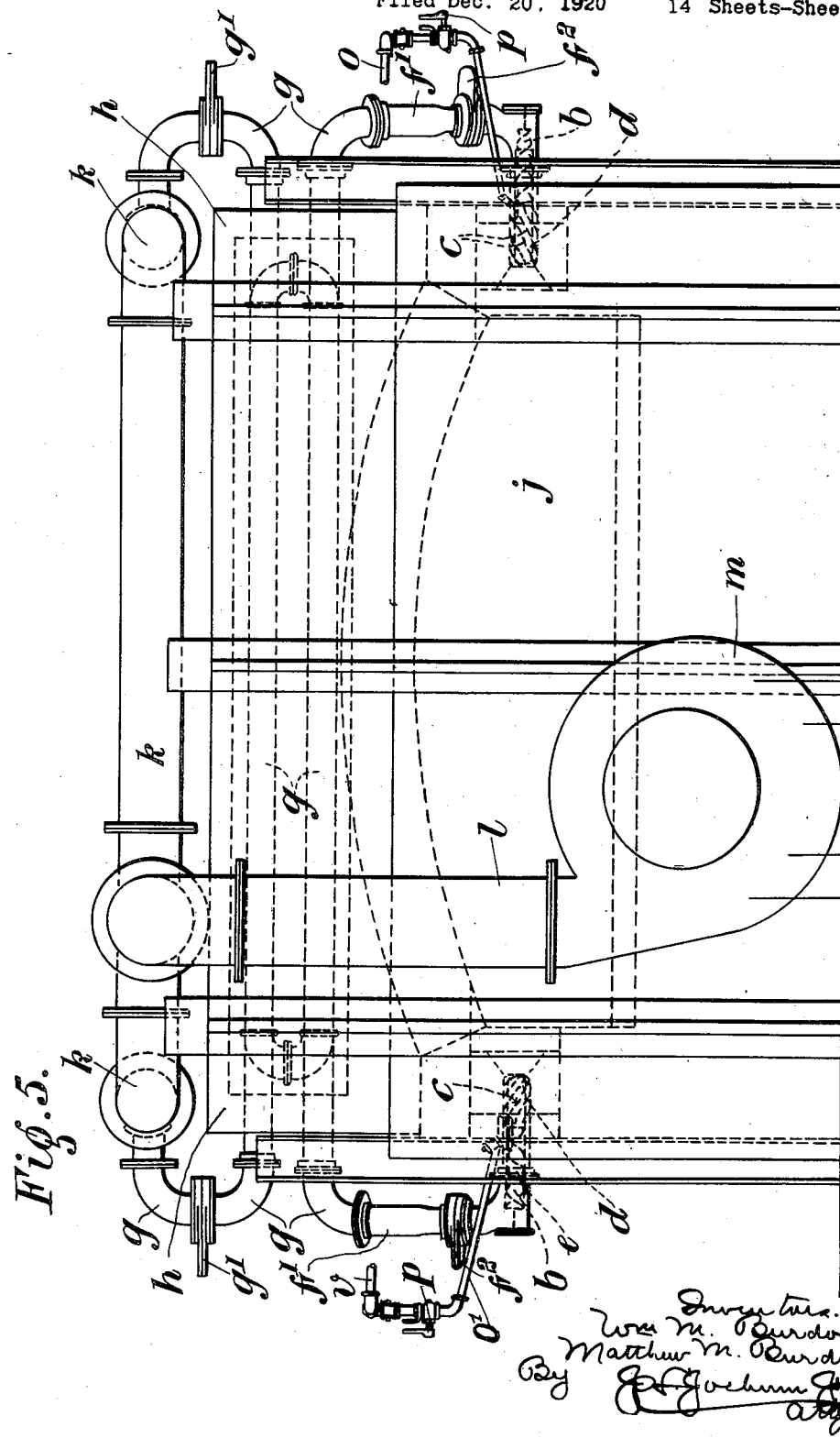

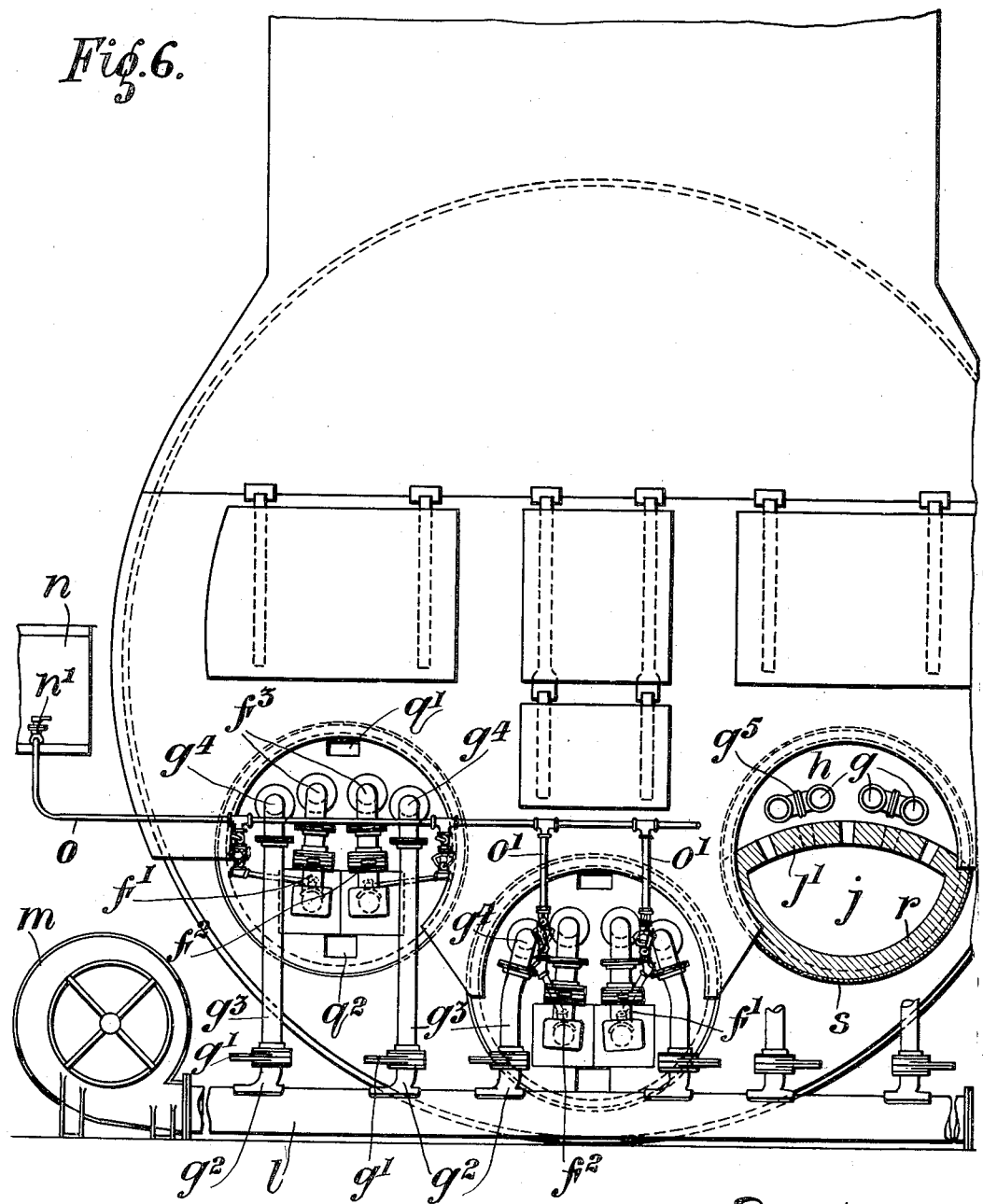

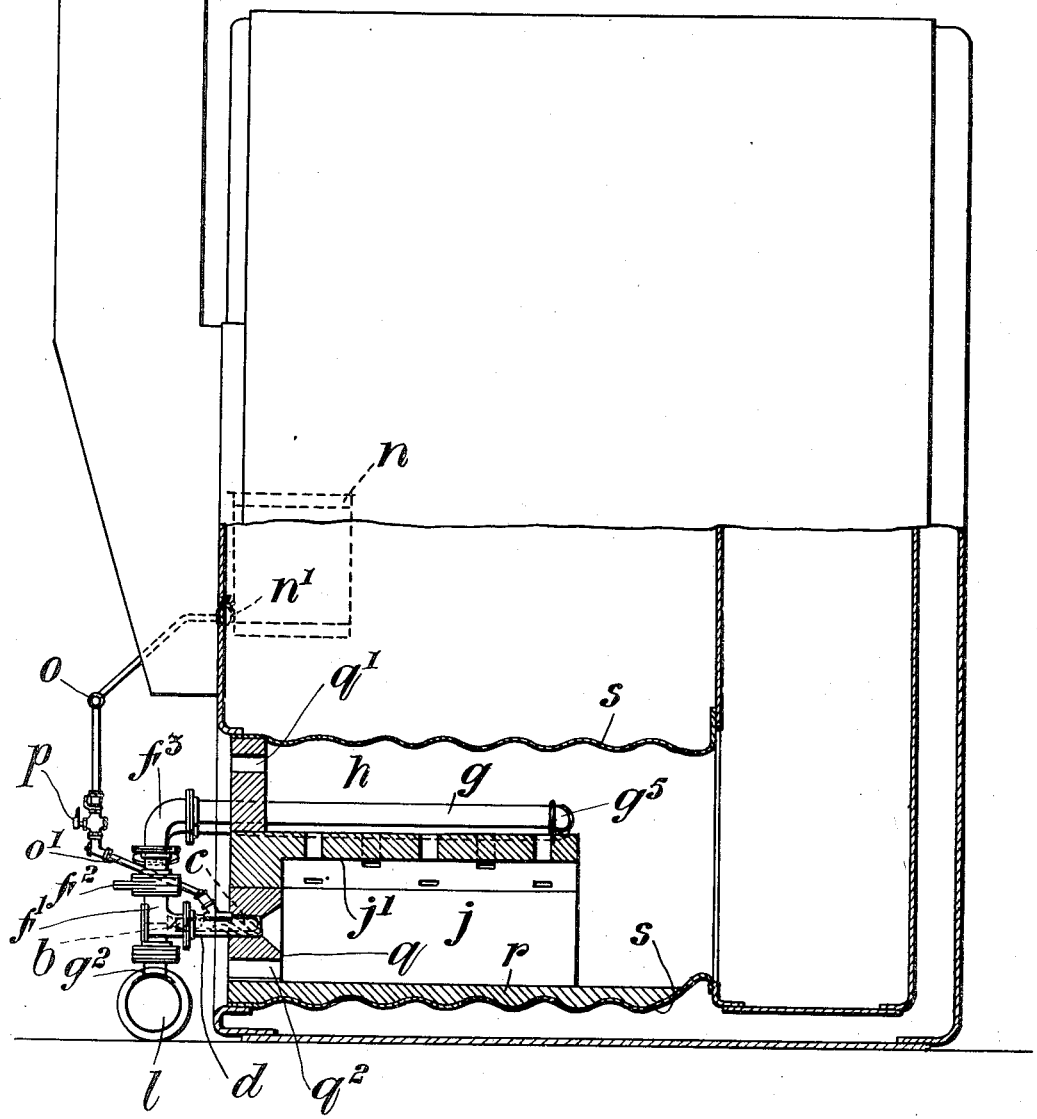

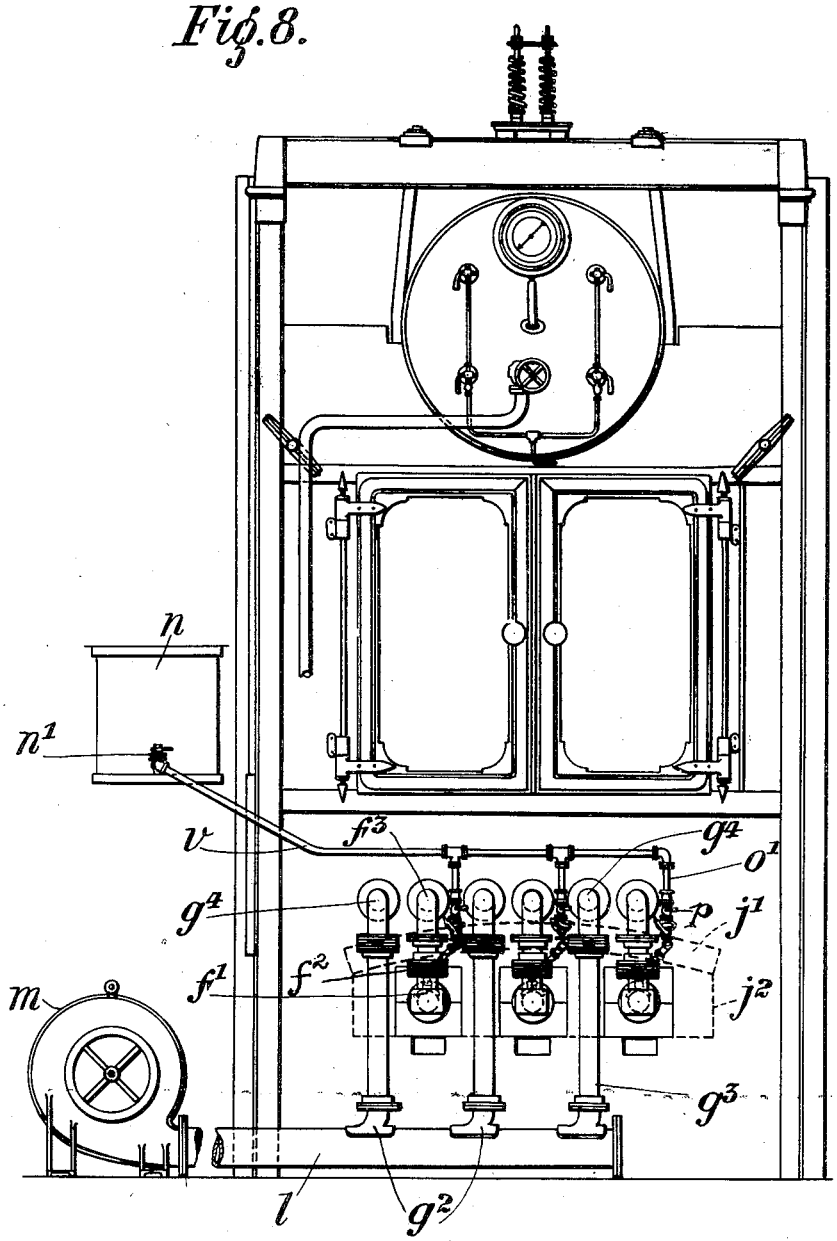

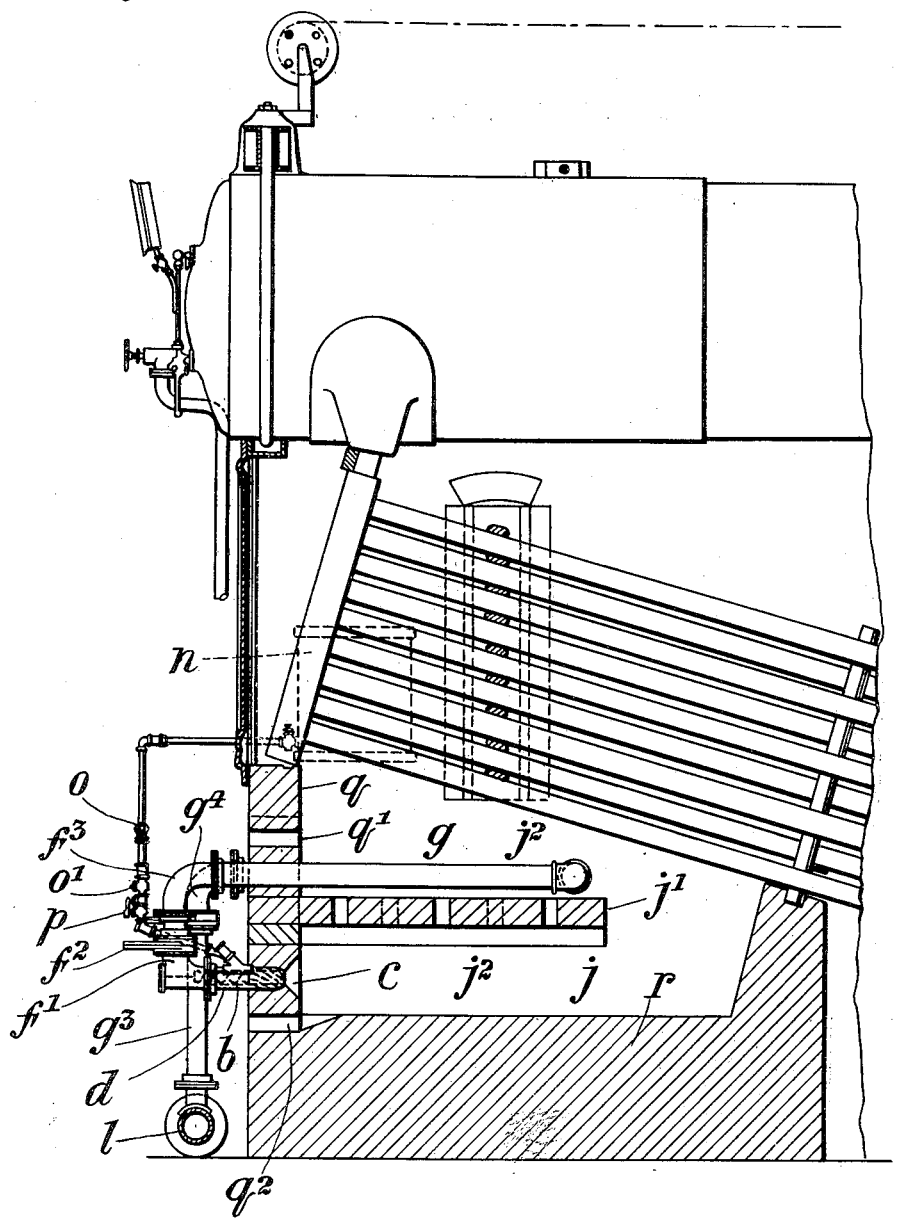

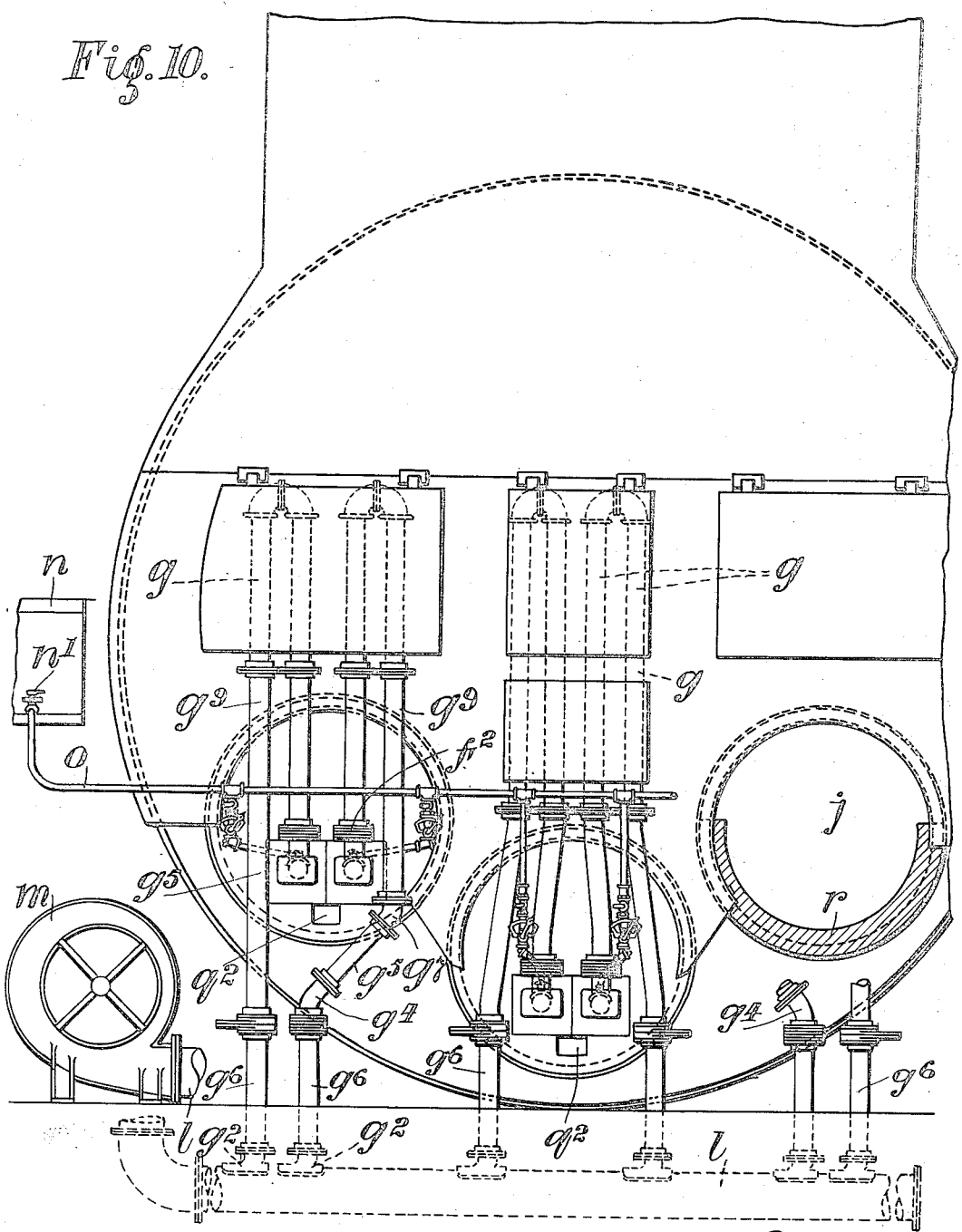

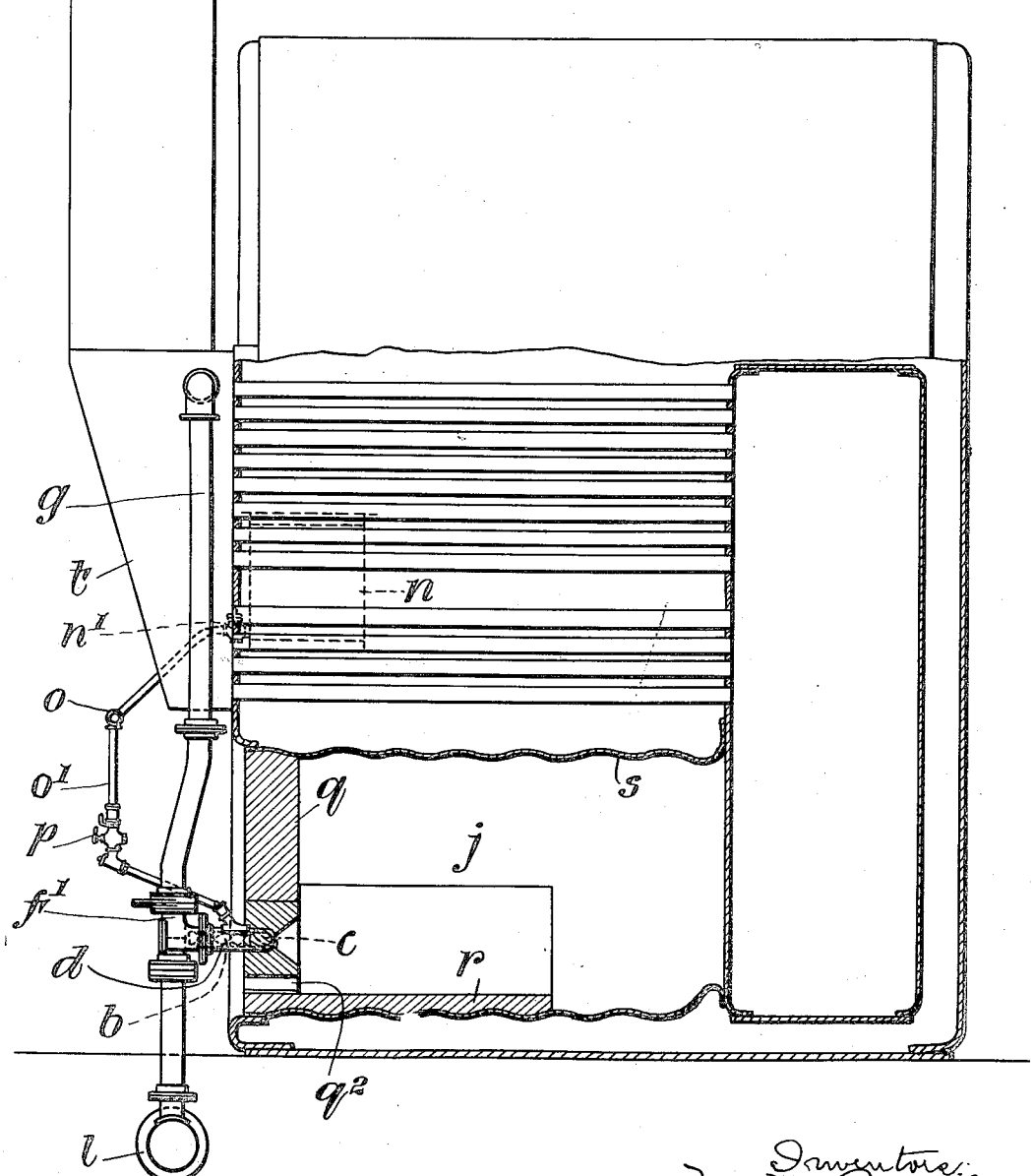

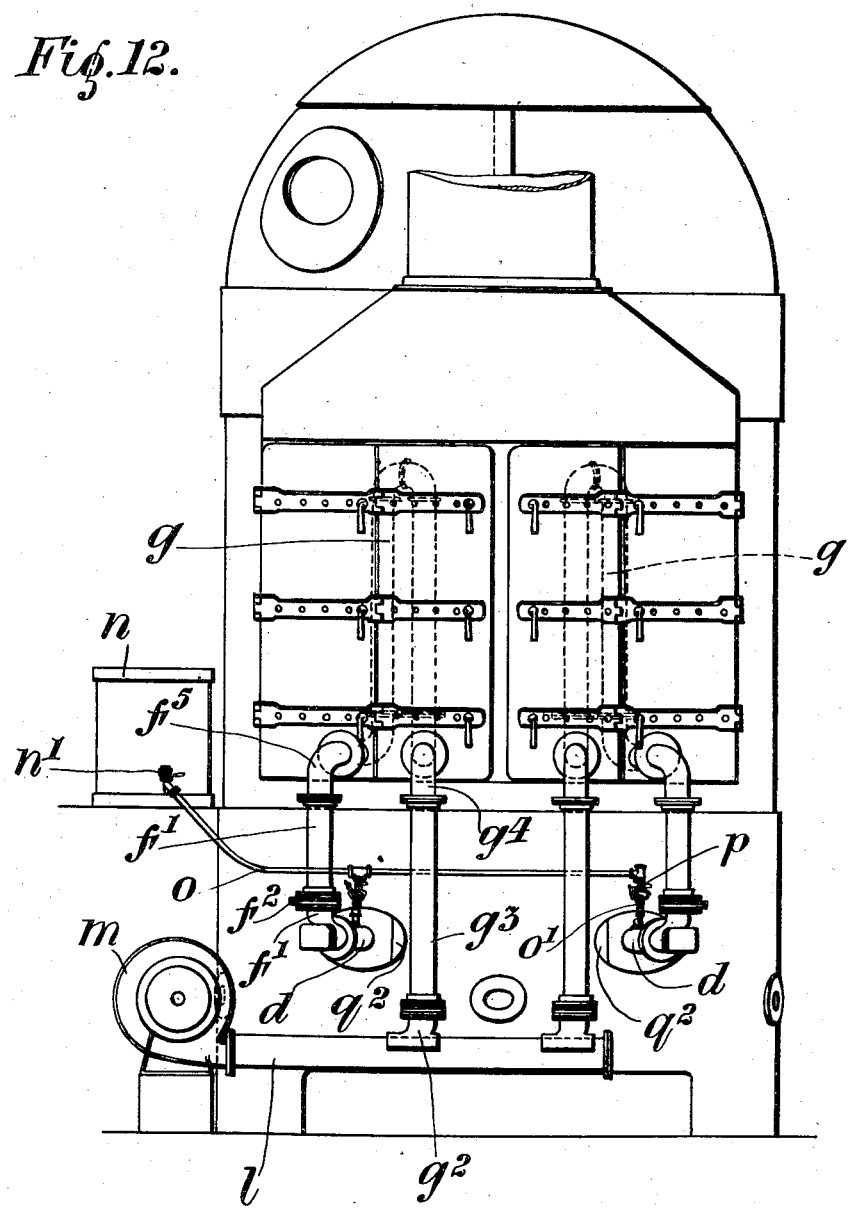

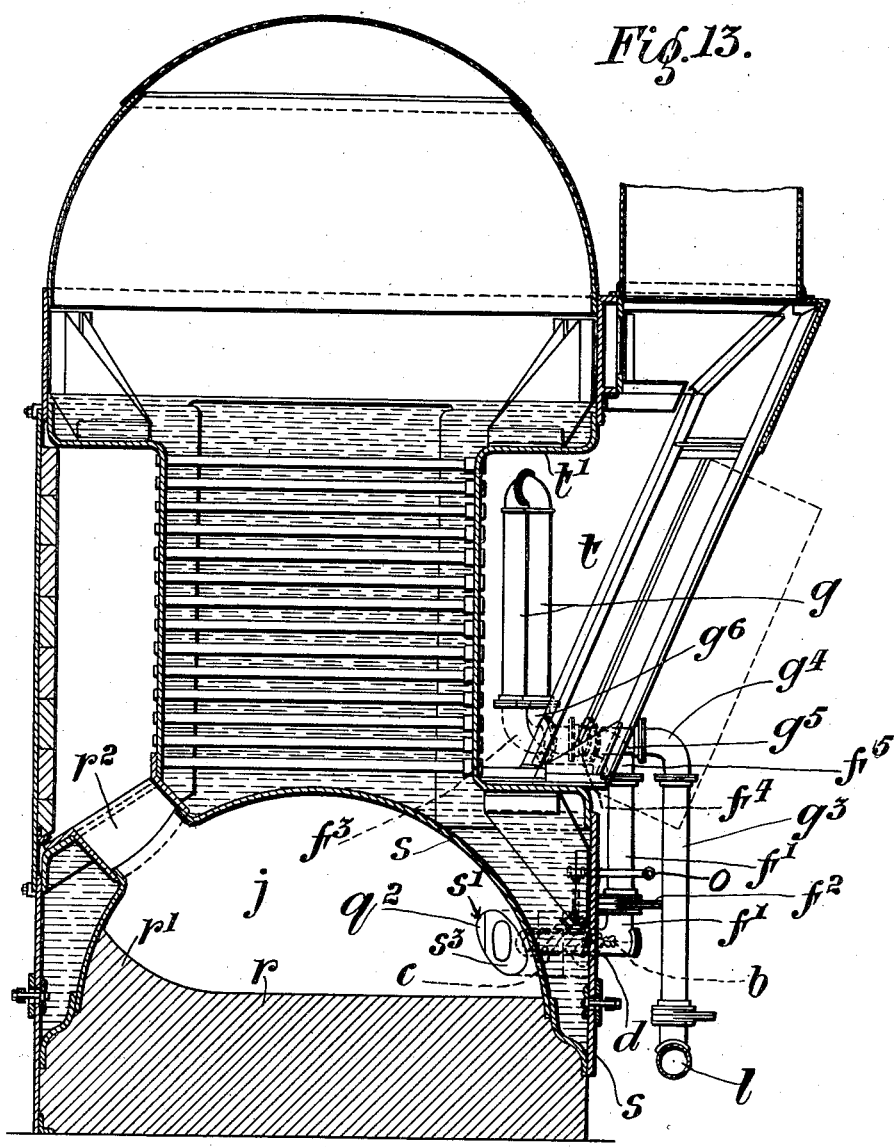

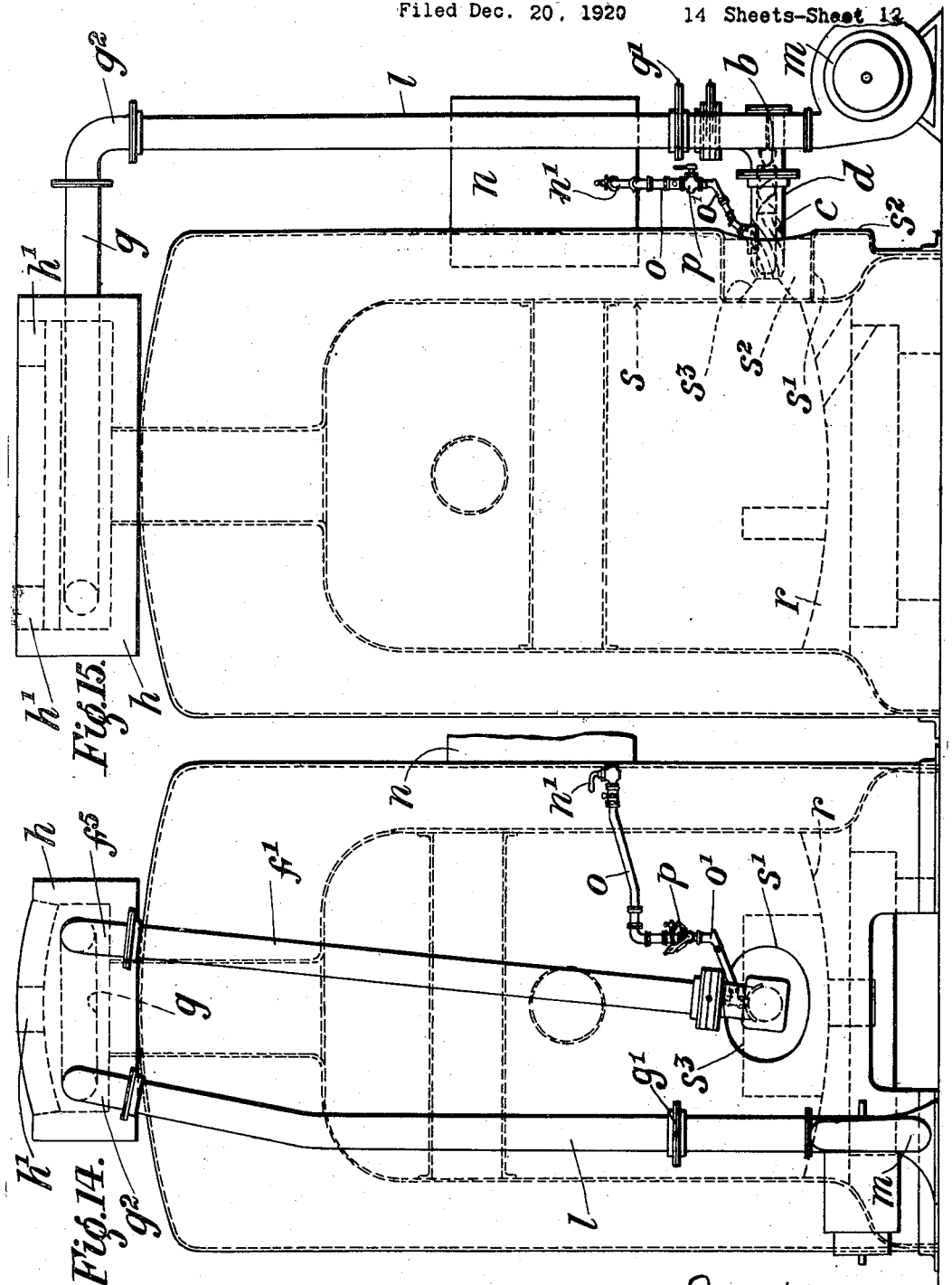

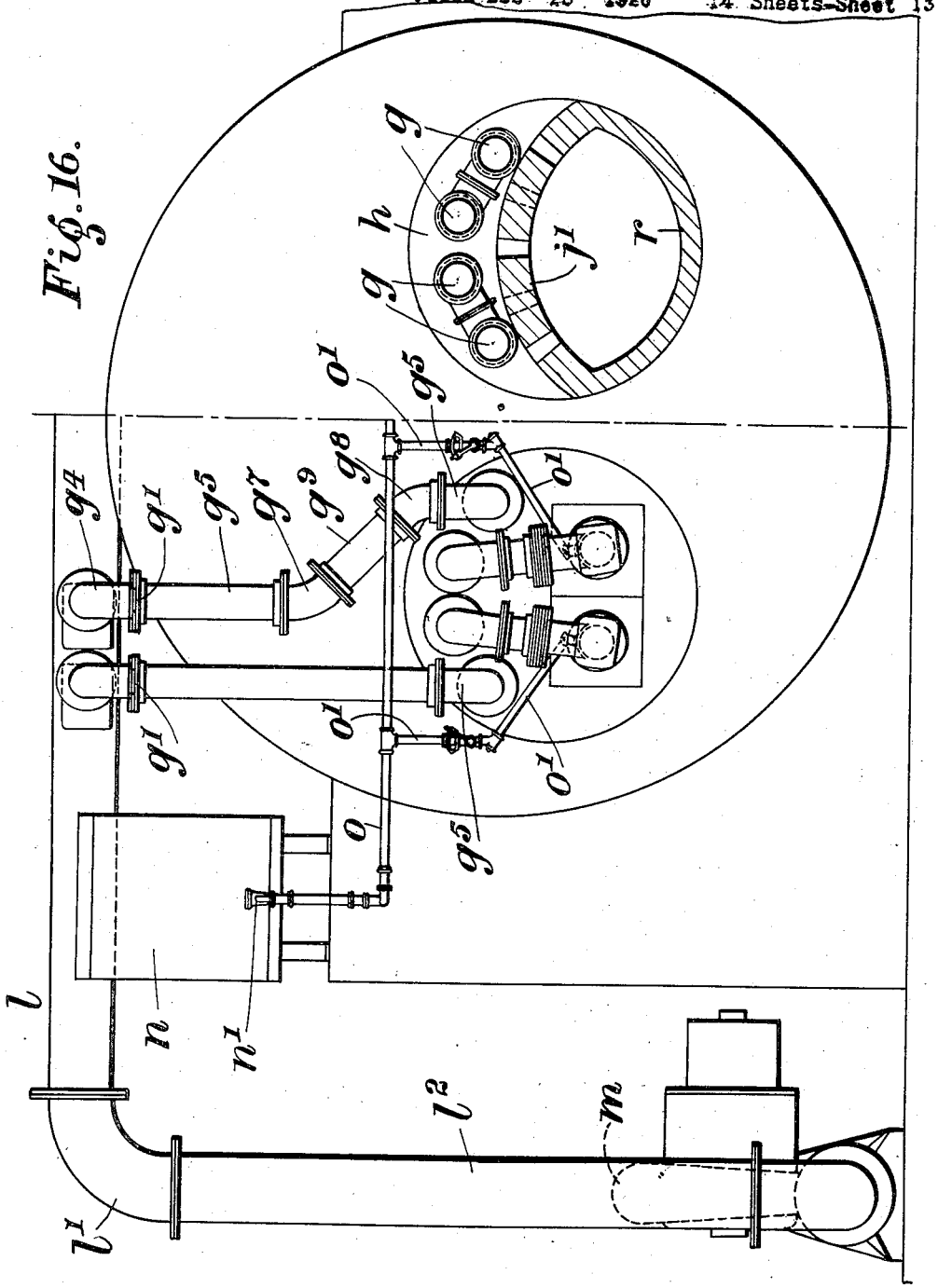

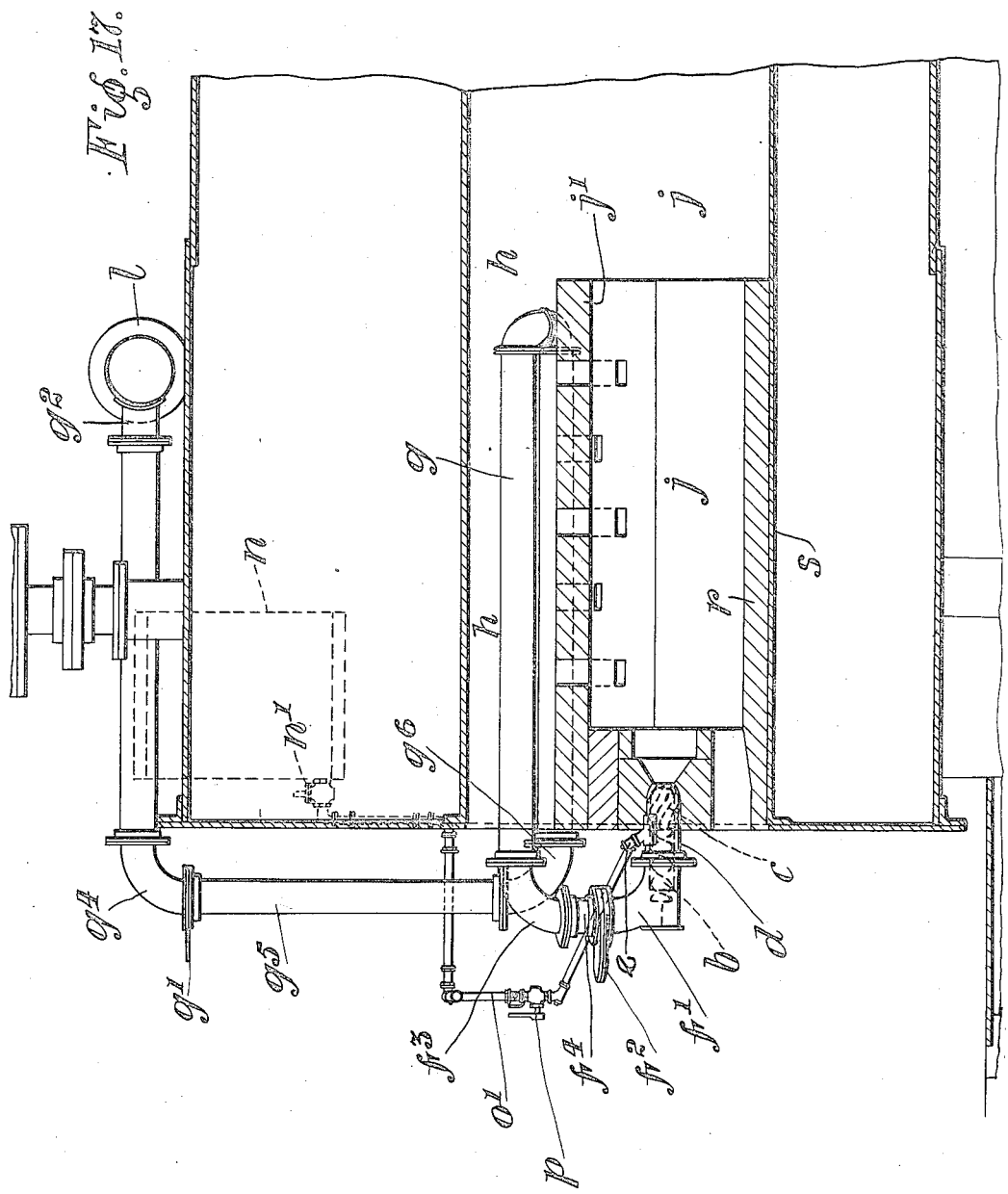

1,500,103

UNITED STATES PATENT OFFICE.

WILLIAM MURRAY BURDON AND MATTHEW MURRAY BURDON, OF BELLSHILL, SCOTLAND, ASSIGNORS TO BURDONS LIMITED, OF BELLSHILL, LANARKSHIRE, SCOTLAND, A CORPORATION OF GREAT BRITAIN.

FLUID-FUEL BURNER.

Application filed December 20, 1920. Serial No. 432,010.

*To all whom it may concern:*

Be it known that we, WILLIAM MURRAY BURDON and MATTHEW MURRAY BURDON, both of Caldervale Works, Bellshill, Lanarkshire, Scotland, and both subjects of the King of Great Britain, have invented certain new and useful Improvements in Fluid-Fuel Burners, of which the following is a specification.

This invention relates to oil-gas burners of the type in which there is an outer tube and an inner tube the inner tube constituting the carburettor to which the oil is delivered through a suitable nozzle whilst heated air is directed through the inner tube or carburettor and also through the annular space between the inner and outer tubes.

This invention also has reference to coal gas and liquid fuel firing of steam generators and boilers wherein the air used with the coal gas or liquid fuel is heated by passing it through regenerative pipes heated by the gases of combustion. In connection with air heating means for liquid fuel firing it has been already proposed to arrange the regenerative pipes within chambers into which the gases of combustion can pass.

The object of this invention is to provide improvements in the construction of burner and in the arrangement and construction of parts whereby an improved heating effect is obtained and a system is provided which is adapted for use with one or any number of furnaces and is adapted for extension to one or more additional furnaces by the use of additional similar and standardized connections or parts.

Under this invention the air (which is preferably heated to a temperature above that of the flash point of the oil) passing through both the inner and outer tubes is caused to whirl or gyrate, by separated spiral directing means concentrically arranged one within the other with the convolutions of one directing means oppositely disposed relatively to the other means, the air passing through the inner tube or carburettor being made to gyrate in one direction and the air passing through the annular space between the inner and outer tubes in an opposite direction. The oppositely gyrating currents are, or may be, caused to impinge upon one another at a point in advance of the burner.

Further under this invention improved constructions and arrangements of liquid fuel firing means are combined with different forms of steam boilers which are particularly constructed for the combination therewith of such firing means, the improved construction and arrangement embodying a fan or blower connected with a main air conduit, a steam generator or boiler provided with a combustion chamber having a closed front wall and with a heating chamber, zigzag regenerative air pipes disposed in a heating chamber, an oil gas burner communicating with the combustion chamber, an oil tank, a main oil conduit and valve controlled connections between the burner and the main oil conduit and between the main air conduit and the regenerative air pipes and between the regenerative air pipes and the burner.

It has been found with our improved burner having two concentric and oppositely whirling or gyrating streams of heated air, one within the other, there is better atomization of the oil and better admixture of the air and oil, and much better gasification. The oil, as it is introduced into the inner gyrating stream of air heated above the flash point of the oil is immediately atomized and at the same time is vaporized more or less completely, the vaporized oil, under centrifugal action, forming a thin film on and in the outer surface or zone of such inner stream and when such film is brought into contact with the outer enclosing oppositely gyrating stream of air, the vaporized oil is further intimately mixed with heated air and more or less completely gasified.

The heating of the air for the burner, under this invention, is preferably effected by passing it through an arrangement of zigzag heating conduits disposed in a chamber or chambers heated by waste gases from the furnace in connection with which the burner is used. In one arrangement each side of the furnace is provided with a series of burners, and where such a series of burners or a battery of furnaces is employed the zig-zag heating conduits for each burner are connected with a blower or equivalent means by a suitable main conduit and an arrangement of distributing conduits.

The invention is hereinafter further described in connection with the accompanying drawings wherein one construction of burner and several arrangements of combination of the firing means with various furnaces are illustrated by way of example and on the accompanying drawings.

Fig. 4 is an elevation of a furnace provided with a series of burners on each side, parts of the air and oil connections being broken away to more clearly illustrate the remaining parts, and Fig. 5 is a side elevation of Fig. 4.

Figs. 6 and 7 are respectively front and side elevations partly in section of a marine boiler.

Figs. 8 and 9 respectively are front elevation and sectional side elevation of a water tube boiler, Figs. 10 and 11 respectively are similar views to Figs. 6 and 7 of an alternative arrangement for a marine boiler, Figs. 12 and 13 respectively are front and sectional side elevation of a dome shaped boiler, Figs. 14 and 15 respectively illustrate front and side elevations of a vertical boiler, and Fig. 16 is a front elevation partly in section and Fig. 17 a sectional side elevation of a Lancashire boiler, all of which examples of steam boilers are shown fitted with and adapted for oil-gas firing for combustion purposes.

Figure 1:
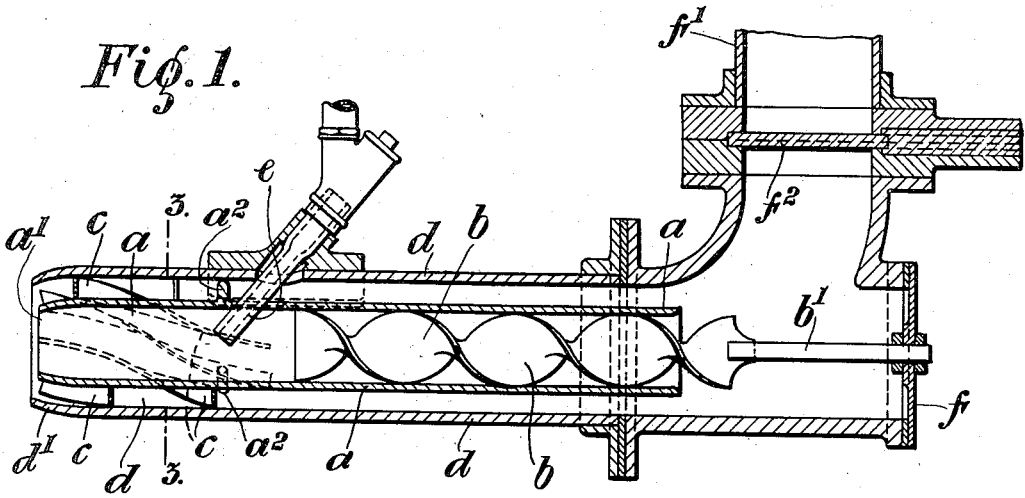
Fig. 1 is a longitudinal section of a complete burner, Fig. 2 a part sectional elevation of the inner tube or carburettor tube.
Figures 2, 3:
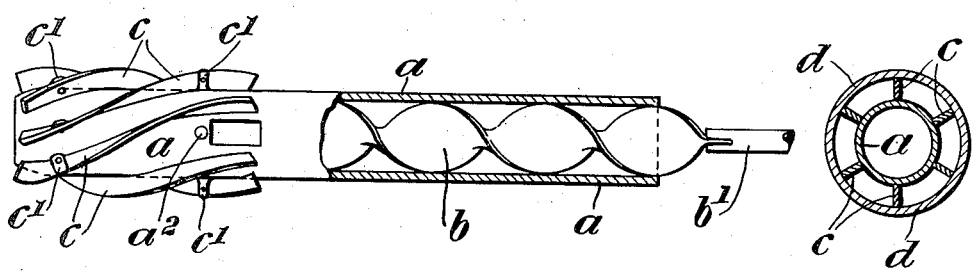
Fig. 3 is a cross section taken on the line 3—3 of Fig. 1.

Referring to the burner shown in Figs. 1, 2 and 3, $a$ designates the carburettor or inner tube of the burner and $b$ a spiral director which is arranged within the carburettor tube $a$. A second spiral arrangement of vanes or their equivalent $c$ is provided between the carburettor tube $a$ and the outer tube $d$ of the burner, the vanes of such second arrangement are oppositely disposed to the convolutions of the spiral director $b$ so as to cause a stream of air passing between the vanes or their equivalent disposed between the outer tube $d$ and the carburettor tube $a$ to gyrate or flow in a spiral course in an opposite direction to a stream of air passing through the carburettor tube $a$ over the spiral director $b$. In the construction shown, the air, which is preferably heated as hereinafter described, is delivered under pressure to the burner and is thereby split up into two streams, an inner stream which passes through the inner tube and is caused to partake of a gyratory motion in a right hand direction by the spiral director $b$, and an outer stream which passes between the inner and outer tubes and the spiral vanes and is caused by the latter to partake of a gyratory motion in a left hand direction. These directions may be reversed if desired.

Oil fuel is delivered to the inner tube in any desirable manner by means of a nozzle $e$ which projects into such tube. The oppositely gyrating streams of air are caused to impinge one upon the other by converging the outlet ends of the inner and outer tubes as shown at $a^1$ and $d^1$.

In the construction shown in Fig. 1, the spiral director $b$ consists of a plate which extends for a part of the length of the carburettor tube $a$ and is provided with an extension $b^1$ at one end adapted to be secured in the end plate $f$ of the burner and thereby serves to support the carburettor tube $a$ centrally of the outer tube, while the opposite end of the inner tube is supported centrally within the outer tube by the spiral vanes $c$ extending on the outside of the inner tube for a portion of the length thereof as shown. In the preferred arrangement the vanes $c$ are secured in position on the inner tube $a$ by means of studs or their equivalents $c^1$ which are formed on or secured in any suitable manner to the inner tube and have the spiral vanes secured by any suitable means thereto. Supports or distance pieces $a^2$ for the inner tube $a$ may be provided on the outer surface thereof and adapted to bear against the inner surface of the outer tube $d$. If desired the vanes $c$ may be constituted by a series of spiral threads formed on the inner or the outer tube.

The longitudinal position of the inner tube relatively to the outer tube is more or less secured by the engagement of the oil nozzle $e$ with the apertures therefor in these two tubes. In the arrangement of burner illustrated a series of six spiral vanes is shown, but it will be understood that this number can be varied as desired, and that any other suitable arrangement for directing the inner stream may be employed other than the single director plate $b$, further, that the spiral director plate and the spiral vanes respectively may be left and right hand spirals instead of as shown in the drawings, and further that the spiral vanes may be arranged for the whole or any portion or portions of the length of the inner tube or carburettor.

The heated air under pressure is delivered to the burner by the delivery pipe $f^1$ which is fitted with a valve $f^2$ for controlling the supply to the burner and is connected with a zig-zag heating or regenerative conduit $g$ disposed in a hot or regenerative chamber $h$ disposed above the furnace $j$ and adapted to be heated by a portion of the hot gases therefrom. In the construction illustrated one of such chambers $h$ is provided for each heating conduit $g$. The regenerative conduits $g$ are connected with distributing conduits $k$ and are fitted with valves $g^1$ for opening and closing the connections with and for regulating the supply of air to the conduits $g$ from the distributing conduits $k$. The distributing conduits $k$ are connected with the main conduit $l$ with which a fan or blower $m$ is connected for supplying air under pressure thereto.

In the arrangement shown, oil is supplied by gravity from an oil tank $n$ through the pipes $o$ to the oil nozzle $e$ of the burners, the supply to each burner being controlled by valves $p$.

The arrangement herein described and illustrated is found to be very serviceable and adapted for use on one or any number of furnaces fitted with a burner at one end or at both ends thereof or at intervals along one or both sides, the distributing pipes being disposed in planes above or below the general level of the furnace or furnaces and adapted for the connection of additional lengths of conduits for the supply of air under pressure to additional burners or furnaces from a main conduit connected with a fan or blower disposed in a suitable position relatively to a furnace or a series or battery of furnaces.

It is to be observed that the burner is adapted for use with furnaces other than the kind described and illustrated and is very suitable for boiler furnace heating and generally for heating, case-hardening, annealing, melting and otherwise treating metal, glass and the like.

In the construction shown in Figs. 6 and 7 the blower or fan $m$ is connected with main air conduit $l$ which is constructed in suitable lengths for use with different forms of steam generators and boilers. To the main air conduit $l$ are attached junction pieces $g^2$ which are curved or shaped as shewn to facilitate the passage of the air from the main air conduit $l$ into the connecting pipes $g^3$. The connecting pipes $g^3$ are fitted with valves $g^1$ which are disposed between such pipes and the junction pieces $g^2$. The opposite ends of the connecting pipes $g^3$ are connected by flanged bent pipes $g^4$ with one end of air regenerative pipes $g$ arranged in zig-zig formation and disposed in the heating or regenerative chamber $h$ provided above the furnace or combustion space $j$ of the steam boiler. Between the heating or regenerative chamber $h$ and the combustion chamber $j$ is arranged a perforated or crown division member $j^1$ which is a plain division wall or arch of the same thickness from end to end. The regenerative pipes $g$ are connected together at their inner ends by elbow junctions $g^5$ which are adapted to be adjusted upon each other and thereby enable the regenerative pipes to be set as desired. The other end of the air regenerative pipes $g$ is connected by elbow pipes $f^3$ with the ends of the air delivery pipes $f^1$ which are connected with the outer tubes $d$ of the burners. Between the burners and the air delivery pipes $f^1$ valves $f^2$ are fitted for controlling the passage of the air from the air regenerative pipes $g$ to the outer tubes $d$ of the burners.

To the burners are also connected branch oil pipes $o^1$ which are fitted with oil valves $p$ and are connected with the main oil pipes $o$ and to the latter is connected the oil tank or reservoir $n$. A valve $n^1$ is provided in the connection between the reservoir or tank $n$ and the main oil pipe $o$.

The outer tubes of the burners are fitted to and set in the firebrick of the front closing wall $q$ of the furnace or combustion chamber $j$ and in conjunction with such wall is formed the crown or division member $j^1$. The wall is also provided with an inspection hole $q^1$ for the heating chamber $h$ and a kindling aperture $q^2$. With the front closing wall $q$ of firebrick and the member $j^1$ is formed the base $r$ of the combustion chamber such base being of curved construction and adapted to support the division member $j^1$ in position within the shell $s$ of the furnace, the firebrick front wall $q$ being adapted to fit the entrance to the said shell with the base and division member extending upwardly therefrom and with the burners and the pipes connected with the regenerative air pipes supported in position thereby.

From the above it will be seen that a very desirable combination of parts is set forth for the application of an oil-gas firing system to a marine boiler, the whole combination of parts being adapted to be fitted to the furnace shell and to be supported in position when so fitted. Further, the parts are so constructed and arranged as to be readily extended for application to an additional marine boiler or boilers.

The combination of parts in conjunction with a water tube boiler illustrated in Figs. 8 and 9 is similar in some respects to that already described and comprises a fan or blower $m$, a main air conduit $l$, curved junction pieces $g^2$, connecting pipes $g^3$, bent junction pipes $g^4$ connected to one end of the zig-zag regenerative pipes $g$, and elbow pipes $f^3$ connected to the other ends of the pipes $g$ and with the air delivery pipes $f^1$ of the burners. Valves $f^2$ are provided for controlling the passage of air to the burners. Oil is supplied to the burners from the oil tank $n$ through the main oil pipe $o$ and branch oil pipes $o^1$, the latter having oil valves $p$ for controlling the supply. In this construction of steam boiler the combustion chamber or furnace $j$ is formed by a firebrick base $r$ of considerable thickness and an arched perforated division or crown member $j^1$, the latter of which extends rearwardly from the front closing wall $q$ and is disposed between the water tubes and the base and is supported on the side walls $j^2$ of the furnace or combustion chamber. The front wall $q$ has the burners and the regenerative air pipes $g$ mounted thereon, and serves to support the same, and is provided with an inspection hole $q^1$ and a kindling aperture $q^2$. The side walls $j^2$ extend upwards and enclose the water tubes of the boiler.

The construction shown in Figs. 10 and 11 comprises an alternative combination for a marine boiler, wherein the regenerative air tubes $g$ are arranged in close proximity to the outlet ends of the fire tubes within the lower portion $t$ of the uptake of the boiler. Such lower portion $t$ serves as a regenerative chamber and is disposed above the front of the furnace, otherwise the construction is similar to that described with reference to Figs. 6 and 7 with the exception that an inspection hole is not required and the division or crown member for forming a heating chamber within the combustion chamber can be dispensed with as the heating chamber for the regenerative pipes is formed by the lower end of the uptake. Further, the air regenerative pipes are connected with the main air distributing conduit $l$ by two arrangements of connections, one arrangement comprising two connecting pipes $g^5$ and $g^6$ and a curved junction piece $g^2$ by which they are attached to the main air conduit $l$, and the other arrangement comprising a curved junction piece $g^2$, a bent junction pipe $g^4$ attached thereto by a connecting pipe, an angular junction piece $g^7$ connected to the bent junction pipe $g^4$ by a connecting pipe $g^5$, and a connecting pipe $g^9$ by which connection is made with the air regenerative pipes $g$.

With the construction and arrangement of parts shown in Figs. 12 and 13, the regenerative air pipes $g$ are vertically arranged within a recess $t^1$ in the lower portion $t$ of the uptake and are directly subject to the gases of combustion as they leave the tubes of the boiler. The type of boiler shown in Figs. 12 and 13, known as a "Cochran" boiler, comprises a dome shaped combustion chamber, which, for the purpose of this invention, is provided with a firebrick base $r$ of considerable thickness formed with an upwardly projecting part $r^1$ at the rear for directing the products of combustion to the outlet $r^2$. For use with the firing system herein described the front of the furnace is specially formed and provided with fitments for mounting the burners in position, such fitments each comprising a tubular fitting $s^1$ connecting the furnace shell $s$ with the outer casing $s^2$, and a firebrick or other suitable lining $s^3$ arranged in the latter and adapted to receive the outer tube $d$ of the burner. In this arrangement, the air supplied from the fan or blower $m$ passes through the main air conduit $l$ and the curved junction pieces $g^2$ to the connecting pipes $g^3$ and thence to the bent junction pipes $g^4$ and further connecting pipes $g^5$ and bent junction pieces $g^6$ to the zig-zag regenerative pipes $g$, from which it passes through the elbow pipes $f^3$ connections $f^4$ and elbows $f^5$ to the air delivery pipes $f^1$ and burners, its passage from the delivery pipes $f^1$ to the burners being controlled by air valves $f^2$. The firebrick linings $s^3$ are preferably so shaped or formed as to leave an opening or openings $q^2$ between the linings $s^3$ and tubular fittings $s^1$ when arranged therein for kindling purposes. The supply of oil from the oil tank $n$ is controlled by oil valve $n^1$ and from this it passes to the main oil pipe $o$ and branch oil pipes $o^1$ which are fitted with oil valves $p$ for regulating the passage of the oil to the burners.

The application of the oil-gas firing system hereunder to a vertical steam boiler is illustrated in Figs 14 and 15. In this arrangement air from the fan or blower $m$ passes through the main air conduit $l$ fitted with air valve $g^1$, and through the curved junction pieces $g^2$ to the zig-zag regenerative air pipes $g$ whence it passes through the elbow $f^5$ to the air supply pipe $f^1$ of the burner. In this arrangement, the steam boiler is specially provided with a regenerative chamber $h$ adapted to be attached to or fitted on the upper end of the boiler and to receive the gases of combustion from the uptake of the boiler and to cause such gases to pass over the said regenerative air pipes. The chamber is preferably of rectangular construction and is formed with an arched roof which is provided with a plurality of outlets $h^1$ at or near the outer edges or zone or region thereof. The lower wall of the chamber is formed or provided with a more or less centrally disposed aperture adapted to so take on to the uptake of the furnace that the waste gases of combustion are delivered into the middle thereof, and consequently are caused to pass throughout the chamber in moving to the outlets $h^1$ and thereby heat the whole of the regenerative air pipes within the chamber. Oil is supplied to the burner from an oil tank $n$ fitted with a valve $n^1$ through the oil pipe $o$ and branch pipe $o^1$ fitted with a valve $p$. The burner is disposed in a firebrick or like lining $s^3$ arranged in a sleeve or tabular fitting $s^1$ connecting the furnace shell $s$ with the outer casing $s^2$ of the steam boiler. The burner comprises separated inner and outer spiral directing means, $b$ and $c$ and is mounted in a fitment provided in the front of the furnace and comprising tubular fitting $s^1$ and a firebrick lining $s^2$. The furnace is provided with a thick firebrick base formed with a dished upper surface.

The arrangement of parts shown in Figs.

16 and 17 and representing a "Lancashire" type of steam boiler fitted with the improved oil-gas firing system, is similar to that previously described with reference to Figs. 6 and 7, with the exception that the main air conduit $l$ is disposed above the steam boiler and is connected with the fan or blower $m$ by an elbow junction $l^1$ and connecting pipe $l^2$. The air from the conduit $l$ passes to the regenerative air pipes $g$ by way of the curved junction pieces $g^2$, connecting pipes extending from the pieces $g^2$ to the bent junction pipes $g^4$, the connecting pipes $g^5$ and bent junction pieces $g^6$ connected to one end of the zig-zag regenerative air pipe $g$, to the other end of which is connected the elbow pipe $f^3$ which is connected with the connections $f^4$. The flow of the air from the connections $f^4$ to the burners is controlled by valves $f^2$ disposed between the connections $f^4$ and the delivery pipes $f^1$ of the burners. The furnace shell $s$ is fitted for a part of its length with a firebrick or equivalent lining, comprising a curved base $r$ and a perforated crown member $j^1$ supported in position on the side edges of the curved base $r$. The burners are supported in a firebrick or like front portion forming part of or connected to the said base and crown, the apertures in the front portion in which the burners are disposed being widened or enlarged towards the inner ends. Above the crown member within the furnace shell $s$ are disposed the zig-zag regenerative air tubes. The supply of oil from a tank $n$ is controlled by an oil valve $n^1$ and the oil is conveyed to the burners by oil pipes $o$ and branch pipes $o^1$.

The air pipes are fitted with controlling valves $g^1$ at the connection between the bent junction pieces $g^4$ and the connecting pipes $g^5$.

In the arrangement shown in Figs. 16 and 17 is also comprised a second form of connections between the regenerative air pipes $g$ and the bent junction pipes $g^4$. In this form the bent junction pipe is connected with the connecting pipe $g^5$ which in turn is attached to an angular junction piece $g^7$ to which is connected a second angular junction piece $g^8$ by a short connection $g^9$, while the angular junction $g^8$ is connected with the bent junction pipe $g^5$ connected to the inner zig-zag regenerative air pipe $g$. Where this arrangement obtains with that previously described, the fittings are adapted for use with other "Lancashire" types of boilers, being adapted to be connected up and arranged in position without the need of providing special connections or junctions, or of making constructional alterations thereto when arranging the parts in position.

From the above description it will be understood that not only is a new system of oil-gas firing for furnaces and steam boilers provided, but an improved means is set forth for the quick application of the means to furnaces and steam boilers, the means being particularly constructed and the parts thereof particularly arranged for the application thereof to various types of furnaces and steam boilers, the means in each case being specially constructed and arranged and comprising parts adapted to facilitate the application of such means to the type of furnace or steam boiler for which it is adapted. The burner is adapted for use with fluid fuel including coal gas.

Having now fully described our invention what we claim and desire to secure by Letters Patent is:—

1. A burner for furnaces comprising an outer tube, an inner tube disposed within the outer tube and acting to divide a current of air introduced into the outer tube into two streams, means on the inner tube for supporting one end of said tube centrally within the outer tube and for gyrating one of said air streams in one direction, means within the inner tube for supporting the other end thereof centrally within the outer tube and for gyrating the other of said air streams in the opposite direction to that of the first mentioned stream, and means disposed angularly to the axis of said burner for introducing fluid fuel under gravity into the inner tube, the inner end of the last said means being disposed in front of the gyrating means in the inner tube.

2. A burner for furnaces, said burner including spaced concentric tubular elements for dividing a current of air into two streams, a spiral director arranged within the inner tubular element and terminating a considerable distance from the outlet end thereof, spirally arranged blades disposed between the said tubular elements and adjacent the outlet ends of the elements for directing the air passing between the said elements to flow in a direction opposite to the direction of flow of the air through the inner tubular element, and a nozzle arranged to direct fluid fuel into the inner tubular element at an angle to the general direction of flow of the air through the elements and at a point intermediate and spaced from the end of the spiral director and the outlet ends of the said tubular elements, the outlet of the said nozzle terminating at substantially the axis of the said director within the inner tubular element.

3. A burner for furnaces, said burner including spaced concentric tubular elements for dividing a current of air into two streams, a spiral director arranged within the inner tubular element and terminating a considerable distance from the outlet end thereof, spirally arranged blades disposed between the said tubular elements and adjacent the outlet ends of the elements for directing the air passing between the said elements to flow in a direction opposite to the direction of flow of the air through the inner tubular element, and a nozzle arranged to direct fluid fuel into the inner tubular element, said nozzle being inclined to the axis of the tubular elements and directed toward the outlet end of the said tubular elements, the end of the nozzle being disposed at a point intermediate and spaced from the end of the said spiral director within the inner tubular element and the outlet ends of said tubular elements, the outlet of the nozzle terminating at substantially the axis of said director within the tubular element.

4. A burner for furnaces comprising an outer tube provided with an end plate, an inner tube supported centrally within the outer tube, a spiral director disposed within one end of the inner tube and provided with an extension which engages with the said end plate and supports one end of the tube thereby, a spiral arrangement of vanes oppositely disposed to the spiral director and arranged around the other end of the inner tube, and means for introducing fluid fuel into the inner tube.

5. A burner for furnaces comprising an outer tube provided with an end plate, and an aperature in a part of its length, an inner tube supported centrally within the outer tube and formed with an aperture, a spiral director disposed within one end of the inner tube and provided with an extension which engages with the outer tube and supports this end of the tube centrally within the outer tube, a spiral arrangement of vanes oppositely arranged relatively to the spiral director and disposed between the inner and outer tubes on the other end of the inner tube and supporting such other end centrally of the outer tube, and a fuel nozzle fitting which projects through the said apertures into the inner tube and secures the inner and outer tubes in their relative longitudinal positions.

6. An oil-gas fired furnace, comprising, in combination a furnace proper, regenerative chambers in communication therewith, burners projecting into the furnace and each embodying inner and outer concentric tubes with a spiral director in the inner tube and an arrangement of spiral vanes disposed between the inner and outer tubes with the convolutions thereof oppositely disposed to those of the spiral director, an oil tank, pipes fitted with valves and connecting the tank with the burners, air delivery pipes connected with the burners and communicating with the inner and outer tubes of each burner, controlling valves disposed between the burners and the air delivery pipes, regenerative air pipes disposed in the said chambers and connected with the air delivery pipes, junction pieces fitted with valves connected with the regenerative pipes, a distributing air conduit to which the junction pieces are connected, a main air conduit connected with the distributing conduit, and a blower connected with the main air conduit for supplying air under pressure to the regenerative pipes wherein it is heated to a temperature above that of the flash point of the oil supplied to the burners and is conveyed under pressure and heated to the burner by the junction pieces and air delivery pipes.

7. A gas fired boiler, comprising in combination a furnace with a firebrick front wall and base, firetubes, an uptake communicating with the firetubes, burners each comprising separated inner and outer oppositely disposed spiral directing means mounted in the front wall, regenerative air pipes disposed in the uptake in close proximity to the firetubes; means for supplying air under pressure through the regenerative pipes to both the inner and outer directing means of the burners, and means for supplying fluid fuel to the inner directing means of the burner.

8. An oil-gas fired boiler comprising, in combination, a furnace with a firebrick front wall and base, firetubes, an uptake communicating with the firetubes, burners each mounted in the front wall and comprising separated inner and outer spiral directing means arranged with the convolutions of the spirals oppositely disposed, regenerative air pipes disposed in the uptake in close proximity to the firetubes, means for supplying oil to the inner directing means of the burner and means for supplying air under pressure and heated to a temperature above that of the flash point of the oil by the regenerative tubes to the inner and outer directing means of the burner.

9. A gas fired boiler, comprising, in combination, a furnace with a firebrick base and a front portion; an uptake, a burner mounted in the front portion and embodying separated inner and outer oppositely disposed spiral directing means, a regenerative chamber in communication with the uptake, means for supplying fluid fuel to the inner directing means, and means for supplying air under pressure to both the inner and outer directing means of the burner and comprising a blower, regenerative air pipes disposed in the regenerative chamber, connections between the blower, regenerative air pipes and burner, and valves controlling the supply of air to the burner.

10. An oil-gas fired boiler comprising, in combination, a furnace including a thick firebrick base and a front portion; an uptake, a burner mounted in the front portion and embodying separated inner and outer spiral directing means arranged with the convolutions of the spirals oppositely disposed; a regenerative chamber forming part of the uptake and comprising a lower wall with an aperture communicating with the uptake; means for supplying oil to the inner spiral directing means and comprising a tank and valve controlled pipes between the tank and such inner directing means; and means for supplying to the inner and outer directing means of the burner air under pressure and heated to a temperature above that of the flash point of the oil and embodying a blower, regenerative air pipes disposed in the regenerative chamber between the central aperture and the outlets, pipes connecting the blower, regenerative air pipes and burner together, and valves for controlling the passage of air to the burner.

11. A gas fired boiler comprising, in combination, a furnace embodying a firebrick base of considerable thickness and a front closing wall of firebrick and formed with kindling apertures, a regenerative chamber communicating with the furnace; burners each comprising separated inner and outer concentric spiral directing means and set and supported in the front wall; means for supplying fluid fuel to the inner spiral directing means; and means for supplying air under pressure to both the inner and outer directing means and embodying a blower, a main air conduit, curved junction pieces attached to the main conduit, bent junction pipes, connecting pipes between the curved and bent junction pipes, regenerative air pipes disposed within the regenerative chamber and connected at one end to the bent junction pipes, elbow pipes connected to the opposite ends of the regenerative pipes, air delivery pipes connecting the burners with the elbow pipes, and valves for controlling the passage of air from the delivery pipes to the burners, the whole of the connections for the supply of air being ready for use and adapted to be assembled and fitted to existing boilers.

12. An oil-gas fired boiler comprising, in combination, a furnace embodying a firebrick base of considerable thickness and a front closing wall of firebrick formed with kindling apertures; a regenerative chamber communicating with the furnace; burners each comprising separated inner and outer concentric spiral directing means arranged with the convolutions of the spirals oppositely disposed and supported in the front wall; means for supplying oil to the inner directing means and comprising an oil tank, an oil pipe connected to the tank, a valve between the tank and the oil pipe, and valve controlled branch oil pipes connecting the oil pipe with the burners, and means for supplying to both the inner and outer directing means compressed air heated to a temperature above that of the flash point of the oil and embodying a blower, a main air conduit, curved junction pieces attached to the main conduit, bent junction pipes, connecting pipes between the curved and bent junction pipes, regenerative air pipes disposed within the regenerative chamber and connected at one end to the bent junction pipes, elbow pipes connected to the opposite ends of the regenerative pipes, air delivery pipes connecting the burners with the elbow pipes, and valves for controlling the passage of air from the delivery pipes to the burners, the whole of the connections for the supply of air being ready for use and adapted to be assembled and fitted to existing boilers.

13. A gas-fired boiler, comprising, in combination a furnace, a firebrick front closing wall to the furnace, a firebrick base forming part of the front wall and adapted to be arranged within the furnace, a regenerative chamber communicating with the furnace, burners each comprising separated inner and outer concentric spiral directing means and set and supported in the said front wall, means for supplying a fluid fuel to the inner spiral directing means, and means for supplying air under pressure to both the inner and outer directing means and embodying a blower, a main air conduit connected therewith, curved junction pieces leading from the conduit, connecting pipes communicating with the junction pieces, valves between the connecting pipes and junction pieces, regenerative air pipes disposed in the regenerative chamber, flanged bent pipes joining the connecting pipes to the regenerative air pipes, air delivery pipes connected with the burner, elbow pipes joining the delivery pipes with the regenerative pipes, and valves disposed between the delivery pipes and the burners, the whole of the parts being ready for use and adapted to be assembled and fitted to existing boilers.

14. An oil-gas fired boiler, comprising in combination, a furnace, burners comprising separated inner and outer concentric spiral directing means arranged with the convolutions thereof oppositely disposed, a firebrick front closing wall in which the burners are mounted and in which kindling apertures are provided in proximity to the burners and inspection apertures are formed, a firebrick base connected with the said front wall, a regenerative air chamber opposite the inspection hole in the front wall; means for supplying oil fuel to the inner directing means of the burner and comprising an oil tank, an oil pipe connected with the tank, a valve between the tank and pipe, and valve controlled branch oil-pipes connecting the the oil pipe with the burners; and means for supplying to both the inner and outer directing means compressed air heated to a temperature above that of the flash point of the oil and embodying a blower, a main air conduit connected therewith, curved junction pieces leading from the conduit, connecting pipes communicating with the junction pieces, valves between the connecting pipes and junction pieces, regenerative air pipes disposed in the regenerative chamber, flanged bent pipes joining the connecting pipes to the regenerative air pipes, air delivery pipes connected with the burner, elbow pipes joining the delivery pipes with the regenerative pipes, and valves disposed between the delivery pipes and the burners, the whole of the parts being ready for use and adapted to be assembled and fitted to existing boilers.

15. A gas fired boiler, comprising, in combination, a furnace embodying a firebrick front closing wall and a curved firebrick base forming part of the front wall and disposed within the furnace shell, a regenerative chamber; burners mounted in the front wall and each comprising separated concentric inner and outer oppositely disposed spiral directing means; valve controlled means for supplying fluid fuel to the inner directing means; and means for supplying air under pressure to both of the spiral directing means of the burners and comprising a blower, a main air conduit disposed above the boiler, curved junction pieces leading therefrom, connecting pipes, regenerative air pipes disposed in the regenerative chamber, bent junction pipes and pieces joining the connecting pipes with the curved junction pieces and the regenerative air pipes, elbow pipes connected with the regenerative air pipes, delivery pipes connected with the burners, connections between the elbow and delivery pipes, and valves for controlling the passage of air through such connections; whereby the junction connections and parts are adapted to be used with existing boilers and assembled directly in position.

16. An oil gas fired boiler, comprising, in combination, a furnace embodying a firebrick front closing wall and a curved firebrick base forming part of the front wall and disposed within the furnace shell; a regenerative chamber; burners mounted in the front closing wall and comprising separated concentric inner and outer spiral directing means the convolutions of the spirals being oppositely disposed; means for supplying oil to the inner spiral directing means and embodying a tank and valve controlled pipes between the tank and the burner; and means for supplying to both of the spiral means of the burners air under pressure and heated to a temperature above that of the flash point of the oil, such means including a blower, a main air conduit mounted on the boiler, curved junction pieces leading therefrom, connecting pipes, regenerative air pipes disposed in the regenerative chamber, bent junction pipes and pieces joining the connecting pipes with the curved junction pieces and the regenerative air pipes, elbow pipes connected with the regenerative air pipes, delivery pipes connected with the burners, connections between the elbow and delivery pipes, and valves for controlling the passage of air through such connections; whereby the junctions, connections and parts are adapted to be used with existing boilers and assembled directly in position.

In testimony whereof we affix our signatures in presence of two witnesses.

WILLIAM MURRAY BURDON.
MATTHEW MURRAY BURDON.

Witnesses:
 WILLIAM BROWN,
 HELEN EADIE.